(12) United States Patent
Ang et al.

(10) Patent No.: US 11,511,412 B2
(45) Date of Patent: Nov. 29, 2022

(54) ROBOTIC SYSTEM

(71) Applicant: Vanabot Ltd, London (GB)

(72) Inventors: Alexander Boon Chong Ang, London (GB); Christopher J M Jones, London (GB)

( * ) Notice: Subject to any disclaimer, the term of this patent is extended or adjusted under 35 U.S.C. 154(b) by 0 days.

(21) Appl. No.: 17/415,721

(22) PCT Filed: Dec. 20, 2019

(86) PCT No.: PCT/EP2019/086598
§ 371 (c)(1),
(2) Date: Jun. 18, 2021

(87) PCT Pub. No.: WO2020/127919
PCT Pub. Date: Jun. 25, 2020

(65) Prior Publication Data
US 2022/0040846 A1    Feb. 10, 2022

(30) Foreign Application Priority Data

Dec. 20, 2018  (GB) ..................... 1820850

(51) Int. Cl.
| B25J 5/02 | (2006.01) |
| B25J 9/00 | (2006.01) |
| B25J 5/00 | (2006.01) |
| B25J 11/00 | (2006.01) |

(52) U.S. Cl.
CPC ............. *B25J 9/0018* (2013.01); *B25J 5/007* (2013.01); *B25J 5/02* (2013.01); *B25J 11/008* (2013.01)

(58) Field of Classification Search
CPC . B25J 5/007; B25J 5/02; B25J 9/0018; B65G 1/0478; B65G 9/00; B66C 11/00
See application file for complete search history.

(56) References Cited

U.S. PATENT DOCUMENTS

| 4,733,783 A | 3/1988 | Benedict et al. |
| 6,315,138 B1 * | 11/2001 | Dyson .................. A61G 7/1015 104/89 |
| 10,023,384 B2 * | 7/2018 | Benedict ................ B65G 1/065 |
| 2017/0355077 A1 | 12/2017 | Miller |
| 2018/0104132 A1 * | 4/2018 | Burke .................. H05K 999/99 |

FOREIGN PATENT DOCUMENTS

| CA | 2639061 A1 | 3/2010 |
| WO | WO2005/082748 | 9/2005 |
| WO | WO2016/029205 A1 | 6/2016 |

* cited by examiner

*Primary Examiner* — William C Joyce
(74) *Attorney, Agent, or Firm* — Hartman Titus PLC; Joseph W Mott

(57) ABSTRACT

A drive system comprises a support structure for a guideway defining an X-Y array of tracks (22, 24) so that one or more carriages (10) can run along the tracks to any desired position. The carriages are intended to either carry a single robotic device or work together to carry a larger robotic device. The track is made up of an array of pegs (14) supported from a ceiling plane made up of an array of tiles (8) which provide for electrical connections to the carriages. Each peg carries a spool mounted between two horizontal flanges that cooperates with a rectangular sprocket connected to a base of a cuboid carriage housing. The carriages are driven by internal electric motors that are arranged to drive two pairs of omniwheels (90) on the ceiling plane while the carriage is supported and guided by means of its sprocket.

17 Claims, 4 Drawing Sheets

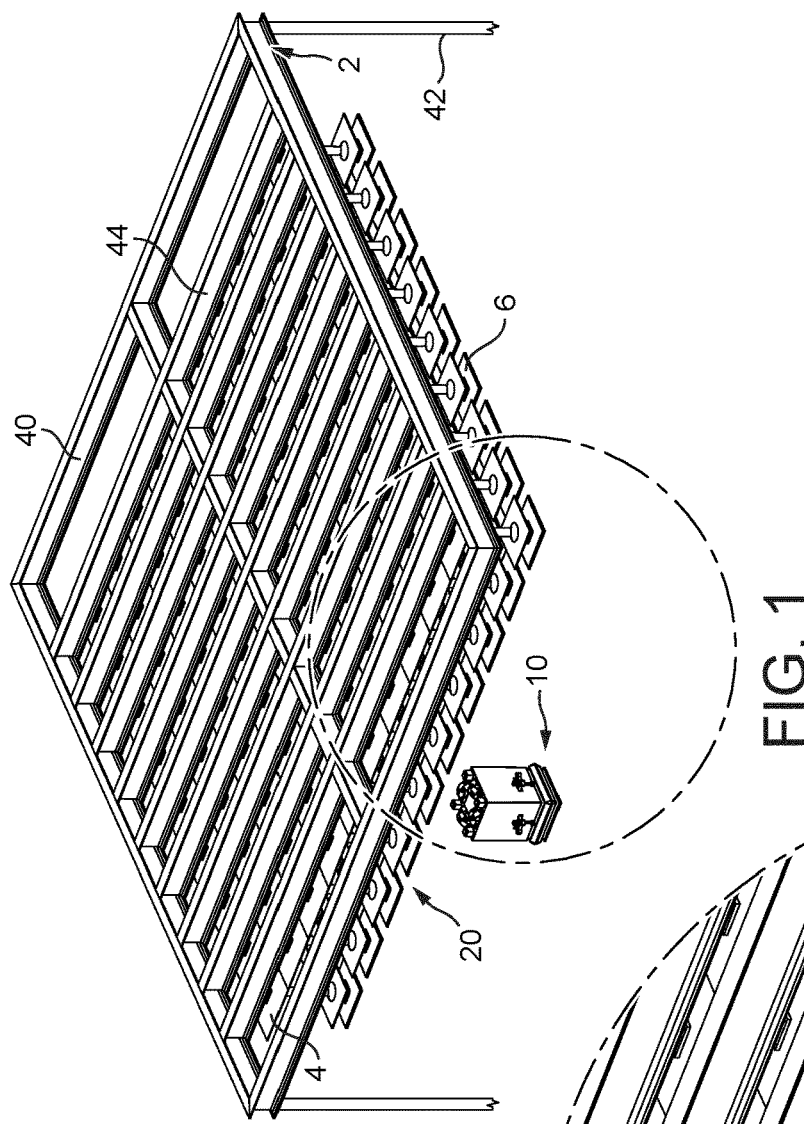
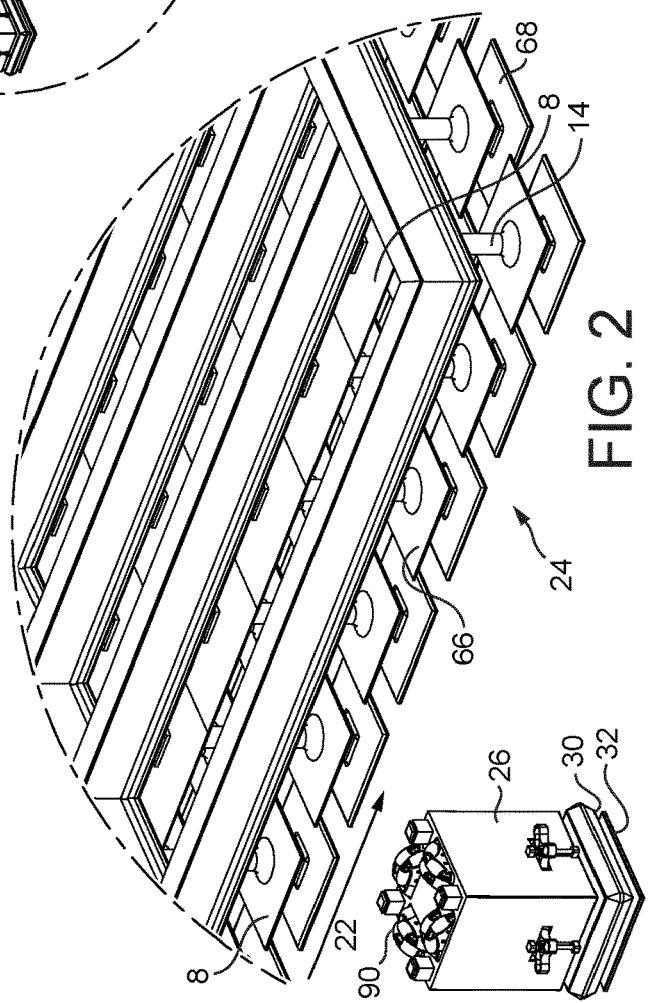

ROBOTIC SYSTEM

TECHNICAL FIELD

The present invention relates to drive systems for robotic devices that are suspended from a ceiling or other elevated plane. Such robotic systems are particularly relevant for home automation or medical care as well as industrial operation.

PRIOR ART

Most overhead robots used in factory automation are located in fixed positions and the objects to be manipulated or treated are moved into position near them. While this is acceptable in the factory, it is not appropriate in a living environment where service may be required anywhere within a large living work space by the same robot.

A suspended automation system suitable for a more domestic environment is described in US2017355077 (A1) Miller 14 Dec. 2017. Miller teaches a system having a support structure for a planar guideway which permits movement of a carriage (described in Miller as a gantry) in both the x and y directions in the guideway plane by means of rails. The carriage can support robotic arms. The carriage is equipped with an electric motor which picks up power from the rails. Miller is particularly concerned with moving objects in storage modules located above the guideway. In Miller's second embodiment the x and y guideways are provided by rails. However when the carriage is to change direction, it must be lifted and this will result in an unstable motion, making it difficult to use this system for supporting manipulators that are required to carry out precise movements under computer control.

Another overhead guide track system is described in WO 2016/029205 (BEC COMPANIES) 25 Feb. 2016. This uses carriages which travel along I beams assembled in an x-y manner so that they intersect. Pedestals are provided at intersections to allow carriages to pass over open gaps. BEC COMPANIES also includes an extensive survey of other tracked prior art.

The use of tracked carriages for patient mobility is described in CA 2639061 (Shiraz) 8 Mar. 2010.

Technical Problems

A particular technical problem is therefore the provision of smooth, accurately predictable motion of the carriage to enable precise computer control of suspended manipulators.

Another technical problem is the safety and reliability of a mechanism for powering the electric motors that drive the carriage.

It is also desirable to provide a carriage which is capable of supporting a wide variety of robotic devices including robotic arms, cable driven robots and parallel robots depending on the application required. Such devices may vary in size, weight and load carrying capacity.

In addition most prior art systems are concerned with the control of a single robotic device at any one time, which limits their scope.

Solution of the Present Invention

The invention is defined in the appended claims.

The system of the present invention is configured to facilitate smooth motion of a carriage without pitching or rolling as it moves in a horizontal plane An advantage of the carriage of the present invention is that a plurality of computer controlled carriages can be used on the same guideway plane either to support separate robotic devices or to work together to support a large robotic device. This allows a system with a single carriage size to fulfil a diversity of functions from transporting a cup of tea to operating a patient winch.

DESCRIPTION OF THE DRAWINGS

In order that the invention can be well understood, an embodiment thereof will now be described, by way of example only, with reference to the accompanying diagrammatic drawings, in which:

FIG. 1 shows a perspective exploded view of the arrangement of the support structure and guideway;

FIG. 2 is an exploded view of a detail of FIG. 1 showing how the parts are assembled to create the guideway;

DESCRIPTION OF AN EMBODIMENT

Figure 8:
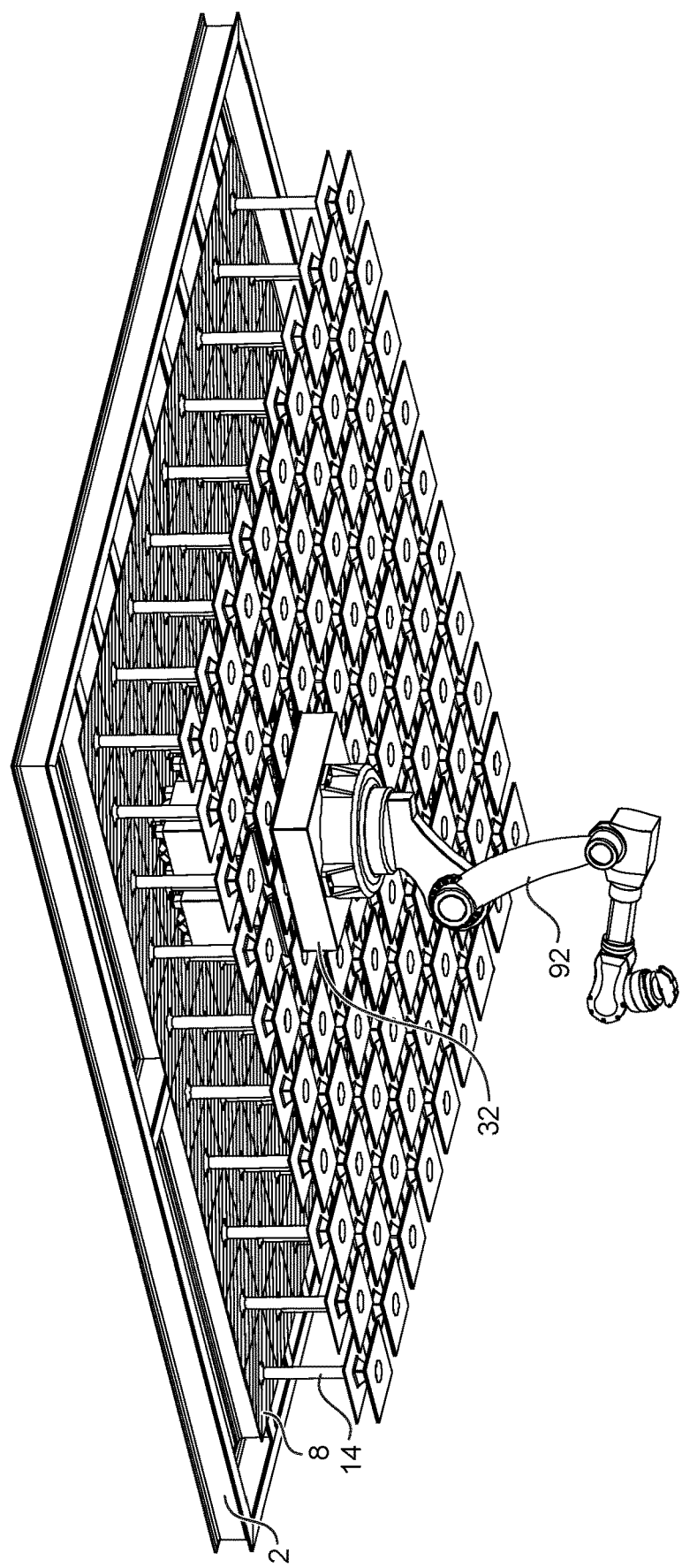
FIG. 8 is a perspective view showing a larger robotic device supported on a connecting plate carried by multiple (four) carriages.

The drive system is designed to enable a carriage 10 or a connected array or train of carriages to be suspended from a support structure incorporating a horizontal frame mounted above a work space such as a living room or warehouse. The carriage is computer controlled and can move in X or Y directions in the plane of the frame along an orthogonal array of tracks. The carriage can support in suspension a variety of manipulators, such as robotic arms, parallel robots or cable driven robots, which are known in the art and which will not be described further in any detail. These manipulators allow a variety of tasks to be performed under computer control in the work space beneath the frame whilst leaving most of the space free of obstruction. FIG. 8 shows how this drive system can be used with a robotic device 92 to provide a complete robotic system.

Figure 7:
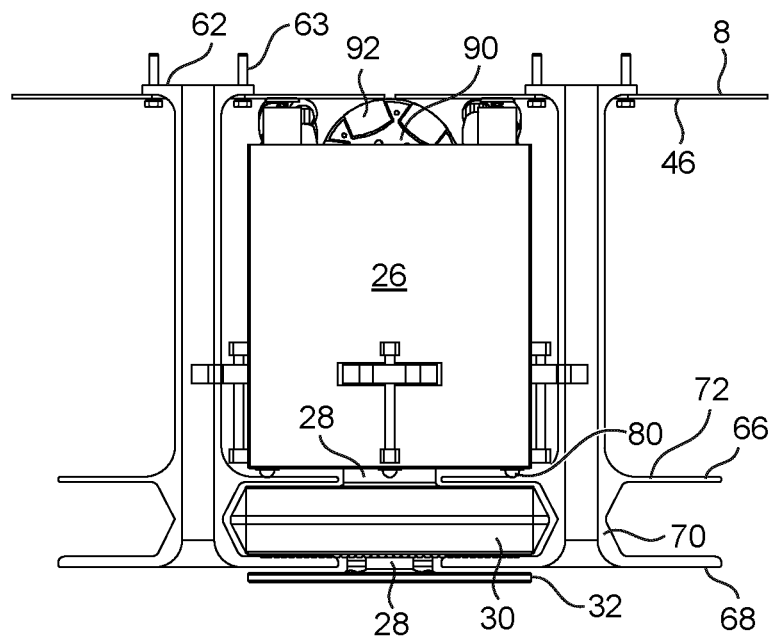
FIG. 7 is a side view of a carriage supported between two pegs of the guideway track.

The robotic drive system comprises a support structure 2 which supports a ceiling plane 4 defined within the horizontal frame, and a guideway plane 6 parallel to and below the ceiling plane 4. The ceiling plane is made up of an array of square tiles 8. The tiles 8 provide the electrical connection for carriages 10 used within the system. An array of pegs 14 is supported by the frame. These pegs work together to define a guideway 20 defining tracks 22, 24 in the X and Y directions of the guideway plane 6. The carriages 10 have a cuboid housing 26 for containing an electric motor and other control equipment. The cuboid housing is supported between the guideway plane 6 and ceiling plane 4 as best shown in FIG. 7. The housing 26 has a neck 28 that carries a rectangular sprocket 30 and a connecting plate 32 beneath the guideway plane that allows other robotic devices to be connected to the carriage 10. The connecting plate 32 can be common to an array of carriages that all move together in synchronism to provide support for a heavy device—see FIG. 8. The sprocket has a projecting V shaped profile.

The carriages 10 can be computer controlled to move smoothly on the tracks created by the design of the pegs 14. This is achieved by sizing the pegs and carriage together, and designing the carriage weight distribution so that the centre of gravity of the carriage is always over a peg flange or between two contacted peg flanges in order to prevent rolling and pitching of the carriage as it crosses between pegs. Movement stability is created by constraining the ratios of the size of the carriage body and peg flange to the open space between two peg flanges. Having the carriage body side dimension greater than two times the distance between two peg flanges results in a stable configuration.

The carriages support other robotic devices such as robotic arms, parallel robots or cable driven robots.

The components of the drive system will now be described separately in more detail.

Support Structure

The support structure 2 is best illustrated in FIGS. 1 and 2. A ceiling plane 4 is defined by a rectangular skeleton frame 40 made up of I section beams welded together and supported at the four corners by columns 42 in this example. It will be appreciated that where the structure covers a large area additional columns along the sides of the frame may be needed. Parallel I-beam ribs 44 traverse the skeleton frame from one side to the other. These ribs may lie in either the X or Y direction. The skeleton frame 40 could in appropriate circumstances be built into the ceiling of a building. However a structure supported on columns 42 allows the structure to be engineered correctly to support the anticipated loads and allows the system to be used in existing buildings.

The ceiling plane 4 is further defined by an array of tiles 8. Each tile is square or rectangular and is sized to be supported between adjacent ribs 44. A lower drive surface 46 of the tile 8 (see FIG. 4) has diagonal contact plates 48, 50 which are connected alternately to positive and negative contacts of an electricity supply. These plates 48, 50 cooperate with corresponding plates of adjacent tiles so that the whole lower surface of the ceiling plane is covered by alternating electrical contact surfaces. Each carriage 10 is equipped with contact brushes 54 at each corner. The spacing of the diagonal contact plates and the spacing of the brushes is such that the brushes of any one carriage are always in contact with plates of opposite poles in order to pick up electrical power for the carriage in a manner similar to a dodgem car. The current is fed through a rectifying circuit in the carriage which allows for a constant DC electrical supply independent of where the carriage is.

Each tile 8 may have a central aperture 60 by means of which it can be bolted to a peg 14. The tiles are supported by the pegs. A slot can be formed in the tiles from the central aperture 60 to an adjacent edge so that they can be positioned round the peg. The tiles could also be arranged so that they have a cut outs at the corners so that four tiles are connected to each peg. In this configuration, the rectangular tiles would have a peg at each corner. The ceiling plane created by the tiles must be sufficiently stiff to resist the forces against it imposed by the moving carriages and it will be appreciated that various design possibilities to support the tiles from the pegs or support frame are possible.

Pegs and Guideway

The guideway plane 6 is spaced below the ceiling plane 4. The guideway 20 consists of orthogonal tracks 22 and 24 in the X and Y directions. The guideway is defined by the pegs 14. Each individual peg is supported by the frame.

Figure 4:
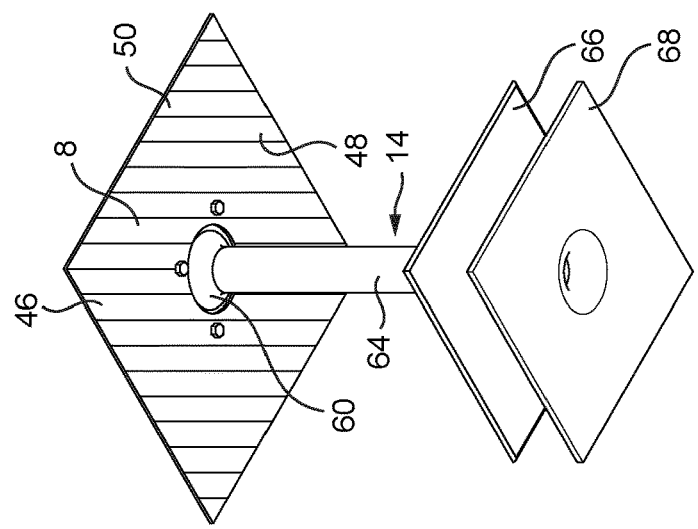
FIG. 4 is a perspective view from below of an individual peg used to define the guideway tracks shown in exploded relation to an underside of an electrical ceiling tile used as part of the support structure.
Figure 3:
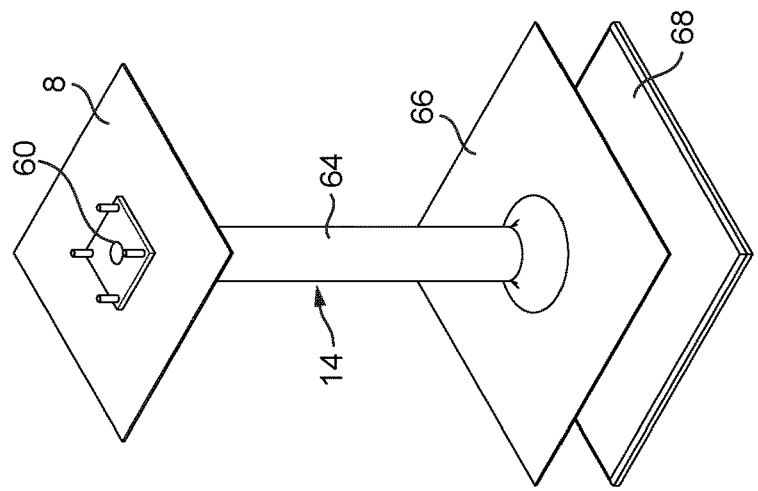
FIG. 3 is a perspective view from above of an individual peg used to define the guideway tracks.

Each peg 14, as shown in FIGS. 3 and 4, has a hollow central stem 64 which is surrounded at the level of the guideway plane by a pair of rectangular flanges 66, 68 dimensioned to be slightly smaller than the dimensions of the tile above in order to permit passage of a carriage neck 28. Between the flanges, the stem is shaped to define a circular spool 70 (see FIG. 7) with an indented V shaped profile, as shown in the figure, that interacts or mates with the shape of the sprocket 30 of a carriage 10 to provide alignment and guidance for the carriage 10. The profiles match with a prescribed tolerance to allow for uniform guidance without binding.

It will be appreciated that the mating faces of the sprocket and spool may have various profiles provided that they interact together to maintain proper guidance.

A peg may be formed in several separable parts to facilitate assembly.

The upper surface 72 of the upper flange 66 provides a bearing surface for a base of the housing of the carriage which is provided with ball bearings 80. A lower surface of the lower flange 68 can be patterned as shown in FIG. 4 to reduce the weight of the peg. The lower surface may be decorated as it will be visible from the workspace beneath. The upper surface of the lower flange 68 provides a bearing surface for the lower surface of the sprocket 30.

Figure 6:
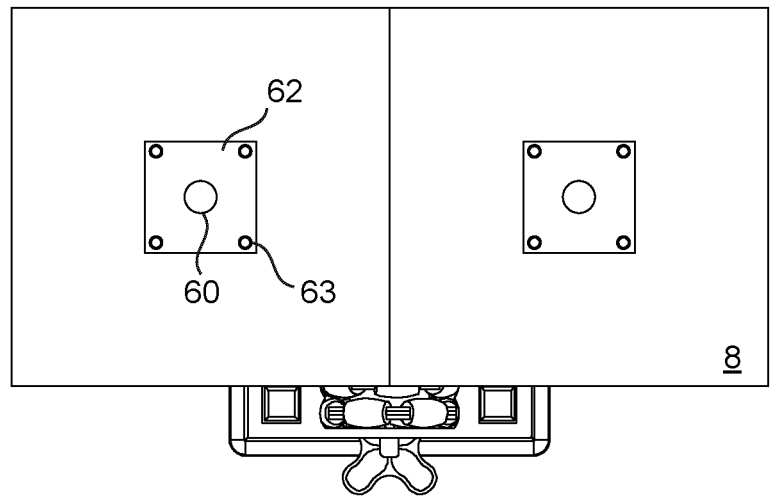
FIG. 6 is a plan view from above showing an electrical ceiling tile used as part of the support structure and electrical system.

The top of the peg terminates in a rectangular flange plate 62 that rests on the upper surface of a ceiling tile 8 as shown in FIG. 6. Bolts 63 pass through each corner of the flange plate to connect the peg to an I-beam via the supported ceiling tile. The pegs 14 may be positioned so that each one passes through the centre of a tile as shown in the figures or alternatively arranged so that each peg is connected to four ceiling tiles where they meet. It will be appreciated that various structural devices could be used to ensure that the pegs depend in the required array from a ceiling plane which provides for the electrical contact.

Carriage

Figure 5:
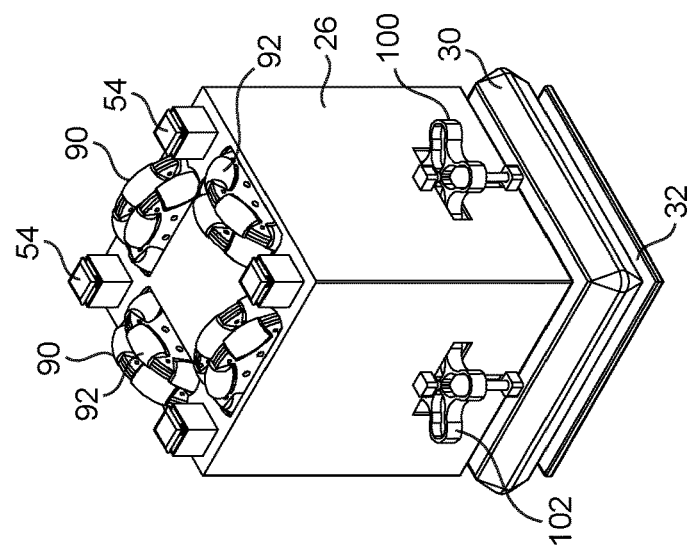
FIG. 5 is a perspective view from above of a carriage.

The overall construction of the carriages is best illustrated in FIG. 5.

The housing 26 of the carriage 10 contains all the drive gear, motors and control equipment for the system. The housing is a cuboid. As illustrated in the present embodiment, the top and bottom of the housing are square. The sides may be rectangular depending on the capacity required to support the internal electric motor and controls. A set of four omniwheels 90 are provided that protrude from the top surface of the carriage and engage with the ceiling tiles to guide the carriage along the tracks. An omniwheel is a bidirectional device which can be driven to rotate about a primary fixed horizontal axis but has, at its periphery, smaller rollers 92 capable of spinning freely about a horizontal axis transverse to the primary axis. This means that the omniwheel can be driven in one direction and allowed to slide transverse to its primary axis when not being driven. Omniwheels of this type are known in the robotic arts and will not be described in further detail. Each carriage has an omniwheel adjacent each other four upper edges of the top face of the carriage. Only two parallel omniwheels will be driven by the internal motor at any one time depending on whether the carriage is intending to move in the X or Y direction. The non-driven omniwheels will slide freely and guide the carriage in a steady horizontal motion.

The brush connectors 54 for providing electrical power to the internal electric motor, and other control systems, are positioned at each of the four corners of the top surface of the housing. Each brush 54 is spring mounted for good engagement with the connecting plates of the tiles The brush connectors supply a rectifying circuit in the carriage body which provides constant DC electrical supply to the internal parts.

In order to allow for restraint of the carriage when the carriage is in a desired working position, each face of the carriage is provided with a rotatable pinwheel 100. The pinwheel is mounted so that it can either freely rotate about a vertical axis or be locked into position under control from within the carriage. Each pinwheel has four arms 102. As the carriage moves along the track, the pinwheel interacts with the stems 64 of the pegs 14 and when the pinwheel is free to rotate it does not inhibit free movement. However, when the pinwheel is locked in position, it acts as a brake against the stem of the peg and holds the carriage firmly in position. In this way the carriage can be locked down at predetermined positions along the tracks.

An underside of the main cuboid carriage housing 26 is supported on the flanges 66 by the ball bearings 80. These ball bearings are provided at least all the way round the sides of the lower face of the housing and the bearings on at least two sides will always be in contact with an upper flange of the peg track depending on the direction of motion.

The stability of motion is controlled by the rectangular V profile of the sprocket 30 engaging with the spools 70 of the pegs as it passes them. The interlocking engagement of the V shaped profile of the sprocket acting against the groove of the spool ensures that the motion of the carriage remains level.

The neck 28 of each carriage supports a connecting plate 32. The plate 32 has been shown as an individual plate per carriage but could be part of a larger connecting plate as seen in FIG. 8. The neck can carry electrical controls to the connecting plate and then to the further robotic device 92 connected thereto. It will be appreciated that the connecting plate can be used to interface with a very wide variety of robotic devices.

Operation of the Robotic System

The system is computer-controlled. An internal computer is provided to do the control. This will be supplied with simple overall instructions by wireless transceivers (i.e. go to this spot). The computer then controls electric motors within the carriages. This type of computer control can be of any known design and will not be further described. Under software control, it will be appreciated that carriages can be guided to the required positions in the horizontal plane. When the carriages are used to support a parallel robotic device, that device can be used to provide smooth motion within a three-dimensional work area beneath the support structure to perform necessary tasks. Where multiple robotic devices are supported on the same support structure, software control must be implemented to prevent collisions.

The invention claimed is:

1. A system for overhead support and control of a suspended robotic device, comprising
   a frame;
   a guideway comprising a plurality of pegs depending from the frame and arranged in orthogonal rows and columns, each peg carrying a horizontal flange, wherein the flanges form a planar surface;
   at least one carriage for supporting a robotic device, having a cuboid housing with a top, base and four sides and a depending neck supporting a guide sprocket;
   wherein the pegs are spaced to permit the carriage to move between them, each peg includes a spool below the flange configured to interact with the carriage guide sprocket in order to guide the carriage, and the flanges comprise a planar guideway and bearing surface for the base of the carriage housing.

2. The system of claim 1 wherein each peg has a second horizontal flange attached below the spool to provide a bearing surface for the sprocket of the carriage.

3. The system of claim 2 wherein the carriage neck carries a connecting plate for connection to a robotic device.

4. The system of claim 3 further including a robotic device mounted to the connecting plate of the carriage.

5. The system of 3 further comprising a plurality of carriages sharing a common connecting plate, and a robotic device mounted to the connecting plate.

6. The system of claim 2 wherein the sides of the carriage have projecting pinwheels which can be used to lock the carriage in position against a peg.

7. The system of claim 6 further including a ceiling plane made up of tiles.

8. The system of claim 7 wherein the carriage further includes two pairs of orthogonal omniwheels protruding from the top of the housing and engaging with the tiles in order to drive the carriage.

9. The system of claim 7 wherein an electrical supply to the carriage is provided by means of brushes engaging with contact plates on the tiles.

10. The system of claim 7 wherein each tile is supported by a peg.

11. The system of claim 2 further including a robotic device attached to the carriage.

12. The system of claim 1 further including a ceiling plane made up of tiles; and wherein the sides of the carriage have projecting pinwheels which can be used to lock the carriage in position against a peg and the carriage further includes two pairs of orthogonal omniwheels protruding from the top of the housing and engaging with the tiles in order to drive the carriage.

13. The system of claim 12 wherein an electrical supply to the carriage is provided by means of brushes engaging with contact plates on the tiles.

14. The system of claim 13 wherein each tile is supported by a peg.

15. The system of claim 1 further including a ceiling plane made up of tiles; and wherein each peg has a second horizontal flange attached below the spool to provide a bearing surface for the sprocket of the carriage; the carriage neck carries a connecting plate for connection to a robotic device; the sides of the carriage have projecting pinwheels which can be used to lock the carriage in position against a peg and the carriage further includes two pairs of orthogonal omniwheels protruding from the top of the housing and engaging with the tiles in order to drive the carriage.

16. The system of claim 15 wherein the ceiling plane made up of tiles is supported by the pegs and wherein an electrical supply to the carriage is provided by means of brushes engaging with contact plates on the tiles.

17. The system of claim 16 further including a robotic device mounted to the connecting plate of the carriage.

* * * * *